No. 805,080. PATENTED NOV. 21, 1905.
J. KRESS.
FLY TRAP.
APPLICATION FILED MAR. 25, 1905.
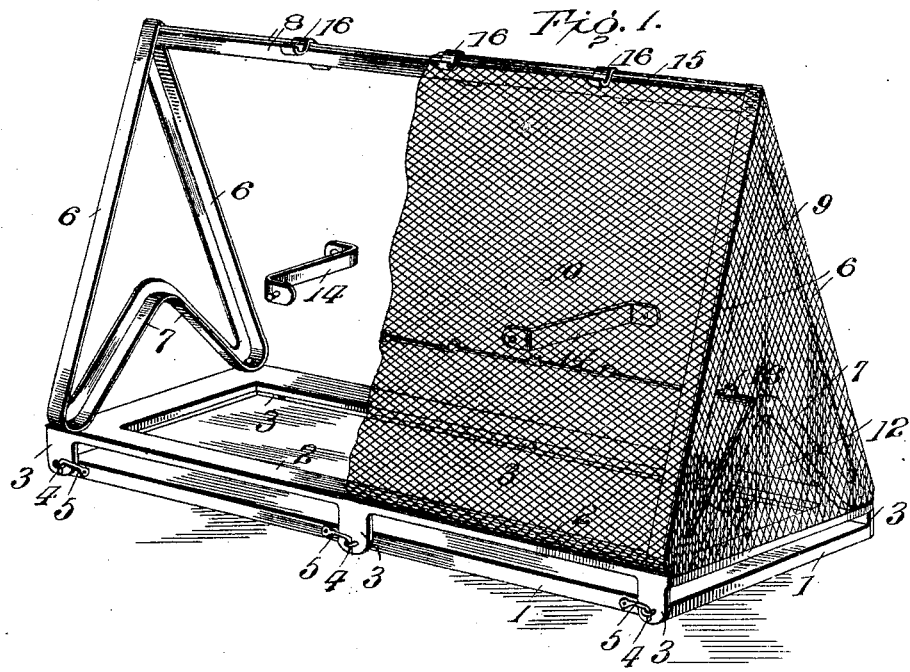
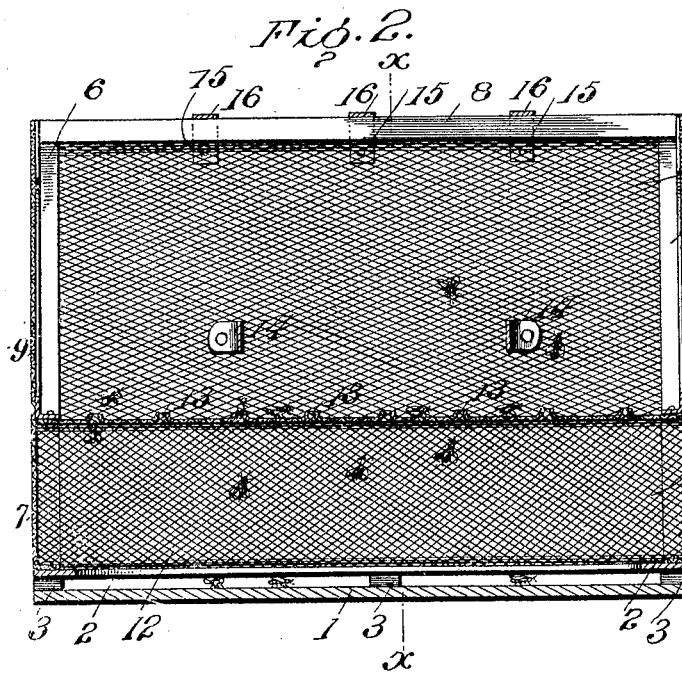
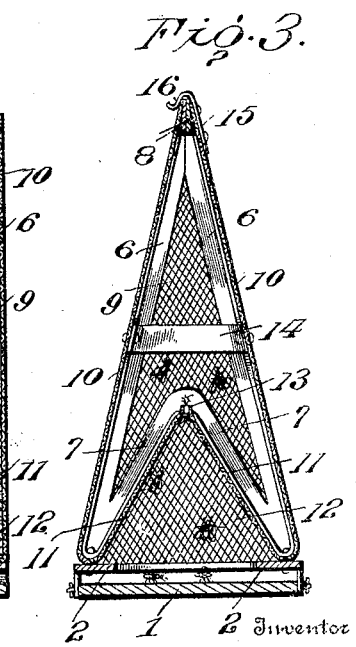
Witnesses
W. N. Woodson
T. H. Johnston
Inventor
Joseph Kress.
By
, Attorneys

UNITED STATES PATENT OFFICE.

JOSEPH KRESS, OF BISBEE, ARIZONA TERRITORY.

FLY-TRAP.

No. 805,080.      Specification of Letters Patent.      Patented Nov. 21, 1905.

Application filed March 25, 1905. Serial No. 252,032.

*To all whom it may concern:*

Be it known that I, JOSEPH KRESS, a citizen of the United States, residing at Bisbee, in the county of Cochise, Territory of Arizona, have invented certain new and useful Improvements in Fly-Traps, of which the following is a specification.

This invention appertains to traps of the type for catching winged insects, such as flies, and intended to rid a locality of such pests.

The purpose of the invention is to provide a trap of the type aforesaid which will admit of ready access thereto of the flies and prevent their escape when once caught and which will admit of the trap being easily and quickly cleaned of the flies or insects after life has become extinct.

For a full description of the invention and the merits thereof and also to require a knowledge of the details of construction of the means for effecting the result reference is to be had to the following description and accompanying drawings.

In the accompanying drawings, forming a part of the specification, Figure 1 is a perspective view of a trap embodying the invention. Fig. 2 is a vertical central longitudinal section of the trap. Fig. 3 is a transverse section on the line X X of Fig. 2.

Corresponding and like parts are referred to in the following description and indicated in all the views of the drawings by the same reference characters.

The trap proper is mounted upon a base 1, which may be seated on a plate or board of proper size. A metal frame 2 is mounted upon the base and is spaced therefrom a short distance by means of legs 3, which preferably form an integral part of the frame 2, consisting of ears bent approximately at a right angle thereto and having openings near their lower ends to receive staples 4, let into the edge of the base and adapted to receive a hook 5 or like fastening to prevent accidental displacement of the legs from the staples 4. End frames 6 are attached to opposite end portions of the frame 2, and each consists of upwardly-converged bars and a Λ-shaped cross-piece 7, the component parts being of integral formation and provided by bending a strip of the bar upon itself into the shape substantially as shown. Each end piece 6 is formed of a strip which is of L form in cross-section, whereby the bars and cross-piece comprise integrally-disposed wings, to which inclosing sides of the trap are attached. Longitudinal bars or strips 8 connect corresponding ends of the upwardly-converged bars of the ends of the pieces 6, and these bars 8 come together at their upper edges, so as to prevent escape of the insects. Wire-cloth 9 covers the end frames 6, and similar material is attached at opposite edges to the inner wings of the converged bars and cross-pieces 7 of the frames 6, said material being attached at its ends to the longitudinal bars 8. The wire-cloth thus attached forms sides 10 and upwardly-converged walls 11 and a tapering space 12, into which the insects pass preparatory to entering the trap. The sides 10 and the walls 11 are thus formed of a continuous piece of wire fabric, and series of openings 13 are formed along the crest of the walls 11 and provide entrances for the insects into the trap. Transverse braces 14 stiffen the sides 10 of the trap and materially assist in maintaining the proper shape.

Strips 15 are attached to the upper ends of the converged bars of the end frames 6 and hold them together and prevent separation of the sides 10 at their upper corners. These strips 15 are bent to conform to the angle formed by the converged terminals of the side bars. Fastenings 16 are located at intervals in the length of the longitudinal bars 8 and are attached at one end to one of said bars and have their hooked ends snapped over the upper edge of the other bar, the construction being such as to admit of liberating the bars when it is required to clean the trap of the insects after being destroyed, said bars being moved apart by pressing the upper ends of the frame 6 inward, thereby causing the bars 8 to bulge outward between their ends, whereby ample clearance is had for removal of the insects.

In practice the trap is baited by placing moistened bran, sweetened substance, or like article upon the base 1, so as to attract the insects, which enter the space 12 through the opening formed between the base 1 and the bars of the frame 2. After entering the space 12 the insects, by reason of their tendency to move upward, pass through the opening 13 into the trap and are caught and may be destroyed in any effective manner, after which they are removed from the trap in the manner stated.

Having thus described the invention, what is claimed as new is—

1. A trap of the character described comprising upwardly-converged sides, bars or strips attached to the converged edges of said sides and adapted to be moved apart by pressing the ends of the bars together, and fastenings for connecting said bars intermediate of their ends substantially as set forth.

2. The herein-described fly-trap consisting of a base, a frame mounted upon the base and having integral legs connecting and transversely spacing it from the base, end frames attached to opposite end portions of the base-frame, each of said end frames comprising upwardly-converged side bars and ∧-shaped cross-pieces, end closures attached to said end frames, upwardly-converged sides and inner upwardly-converged walls attached to corresponding parts of said end frames, longitudinal bars attached to the upper edges of said converged sides, braces for staying opposite ends of the longitudinal bars, and fastenings for connecting the longitudinal bars at points intermediate their ends.

In testimony whereof I affix my signature in presence of two witnesses.

JOSEPH KRESS. [L. S.]

Witnesses:
V. B. HILLYARD,
T. H. JOHNSTON.